United States Patent [19]

Dougherty et al.

[11] Patent Number: 5,449,083

[45] Date of Patent: Sep. 12, 1995

[54] REUSABLE AND COLLAPSIBLE GARDEN CONTAINER FOR COLLECTING AND TRANSPORTING LOOSE DEBRIS

[76] Inventors: Michael Dougherty, 50 Presidential Plz., Apt. 909, Syracuse, N.Y. 13202; Richard Vinal, 400 Roberts Ave., Syracuse, N.Y. 13207

[21] Appl. No.: 290,546

[22] Filed: Aug. 15, 1994

[51] Int. Cl.$^6$ ............................................. B65D 33/02
[52] U.S. Cl. ........................................ 220/9.1; 220/9.2
[58] Field of Search ................. 220/9.1, 9.2, 9.3, 4.28, 220/6, 4.16, 666, 668; 383/12, 33; 56/202

[56] References Cited

U.S. PATENT DOCUMENTS

| | | | |
|---|---|---|---|
| 592,778 | 11/1897 | Hargrave | 383/12 |
| 1,005,014 | 10/1911 | Franke | 383/12 |
| 2,079,592 | 5/1937 | Battin | 383/33 |
| 4,006,928 | 2/1977 | Beugin | 383/33 |
| 4,050,492 | 9/1977 | Veilleux | 383/12 |
| 4,258,538 | 3/1981 | Morse | 56/202 |
| 4,574,568 | 3/1986 | Trelford | 56/202 |
| 4,620,319 | 10/1986 | Sheehan et al. | 383/33 |
| 4,648,238 | 3/1987 | Greider et al. | 56/202 |
| 4,693,064 | 9/1987 | Katayama | 56/202 |
| 5,011,103 | 4/1991 | Hayes | 383/33 |
| 5,061,086 | 10/1991 | Vallerga | 383/33 |
| 5,118,019 | 6/1992 | Harrison | 383/33 |
| 5,163,278 | 11/1992 | Martenhoff et al. | 56/473.5 |

FOREIGN PATENT DOCUMENTS

| | | | |
|---|---|---|---|
| 112081 | 12/1940 | Australia | 220/9.1 |
| 1289567 | 9/1972 | United Kingdom | 383/33 |

*Primary Examiner*—Stephen J. Castellano
*Attorney, Agent, or Firm*—Katherine McGuire

[57] ABSTRACT

A reusable, durable, lawn and garden bagger for the easy collection and transportation of a quantity of loose debris such as leaves and grass clippings, for example. The bagger provides a collapsible container which provides an enlarged opening when secured in the fully open position, and wherethrough loose debris is deposited with a garden tool such as a rake, for example. Handle means are provided at both ends of the container whereby a worker may pull the full container along the ground by the front handle means, and subsequently dump the debris from the container by lifting upwardly on the back handle means.

10 Claims, 2 Drawing Sheets

REUSABLE AND COLLAPSIBLE GARDEN CONTAINER FOR COLLECTING AND TRANSPORTING LOOSE DEBRIS

BACKGROUND OF THE INVENTION

This invention relates to loose material handling apparatus and, more specifically, to a collapsible, reusable, lawn and gardening bagger which is especially useful for easily collecting and transporting a quantity of raked leaves, grass clippings, or other debris to a location remote from the initially raked area.

Landscaping and gardening work typically involves the gathering and disposing of large quantities of unwanted organic debris in loose form such as leaves, grass clippings, twigs and other cuttings. Due to present day environmental concerns and regulations, such organic debris must be composted either by the landowner, or by a municipality which arranges for scheduled pick-ups of debris which must be prepared for such pick-ups typically by placing the debris in neat piles on the side of the road or street in front of the house or other building.

On the other side of the coin, such landscaping and gardening work also typically involves gathering and transporting large quantities of wanted organic material in loose form to compost piles which many present-day, environmentally conscious gardeners create and continuously add to in a remote location for later retrieval and use in their garden beds.

Known material handling equipment intended for this type of bulk material transport include the well known wheelbarrow, of course, which, due to its raised container height, requires manual lifting of the loose material into the wheelbarrow. The other widely used containment method involves the time consuming, laborious task of stuffing the loose material into large lawn and garden bags. This is typically accomplished by the worker hand-lifting the material into the bag, perhaps with the aid of a rake or other garden tool. A funnel-type device such as that seen in U.S. Pat. No. 5,163,278 may be used to keep the bag opening expanded while the debris is placed in the bag.

Other known material containers may be attached directly to a garden tool (e.g., a lawnmower) for collecting the debris from the discharge chute thereof. These containers may be of both the rigid and collapsible types, with a representative few disclosed in the following U.S. Pat. Nos.:

| U.S. Pat. No. | Inventor | Issue Date |
| --- | --- | --- |
| 4,258,538 | Morse | 3/31/81 |
| 4,574,568 | Trelford | 3/11/86 |
| 4,648,238 | Grieder et al | 3/10/87 |

While the above-mentioned inventions appear useful in combination with the mowers for which they were designed, they do not address the need for a lawn and garden bagger which one can use to directly rake a quantity of loose debris therein, and then proceed to transport the bagger and debris together to a remote location whereupon the debris is removed from the bagger.

SUMMARY OF THE INVENTION

It is thus a main object of the present invention to provide a lawn and garden bagger which may remain on the ground throughout the steps of collecting and manually transporting a quantity of loose lawn and garden debris deposited therein.

It is a further object of the present invention to provide a lawn and garden bagger of the above type which is extremely durable and capable of being repeatedly pulled in an easy manner along a variety of ground surfaces.

It is another object of the present invention to provide a lawn and garden bagger of the above type which is selectively movable between a collapsed, compact state for easy storage, and a fully opened state wherein the bagger is provided with a large opening wherethrough loose lawn and garden debris such as leaves and grass clippings, for example, may be easily and quickly raked directly into the bagger.

Other objects will in part be obvious and in part appear hereinafter.

In accordance with the foregoing objects, the present invention comprises a lawn and garden bagger which is capable of being manually pulled along the ground for the easy collection and transportation of a large quantity of loose lawn and garden debris for subsequent deposit at a remote location. More particularly, the bagger comprises a collapsible container having a rigid bottom wall of generally rectangular outline which may be molded or otherwise formed of a rigid plastic or other suitable material. During use, this bottom wall is placed flatly upon the ground in the vicinity of the area to be cleaned of the debris. An upper, generally U-shaped framework preferably comprised of rigid, tubular aluminum or plastic is of approximately the same width and length dimensions as the bottom panel with the opposite, free ends thereof pivotally attached to the opposite sides of the front edge of the bottom wall such that the rear edge of the bottom wall and the rear length of the upper framework may be alternately moved together and apart. The degree to which the bottom wall and upper frame may be moved apart from each other is limited by a pair of triangular-shaped, flexible panels of material attached to and interconnecting the respective side edges of the bottom wall and upper frame. A third panel of flexible material is attached between the side and rear edges of the tubular framework thereby forming the top wall of the bagger.

The bagger may thus be alternately moved between a fully open state, wherein the upper framework is pivoted away from the bottom wall, and a fully collapsed state, wherein the top and bottom walls lie in intimate, overlapping relationship. Means are provided to releasably secure the bagger in the fully opened state wherein a front opening and internal cavity are defined for the deposit of looses debris therein. In actual usage, the bottom panel is laid flatly upon the ground in the proximity of the area to be raked. With the bagger secured in its fully open state, the worker proceeds to gather loose debris and deposit it within the bagger through its front opening which lies directly adjacent the ground. The depositing of the debris in the bagger is greatly facilitated by the use of a garden tool (e.g., a rake), although other depositing methods may be chosen.

Handle means are provided adjacent both the rear and front edges of the bottom wall whereby once the bagger is initially filled with debris, the worker may pull the bagger and debris along the ground to a remote location by grabbing the handle at the front of the bottom wall (i.i, adjacent the front opening), and subsequently dump the debris from the bagger by grabbing the handle located adjacent the rear edge of the bagger and lifting whereupon the debris falls out of the bagger through the front opening thereof.

DETAILED DESCRIPTION

Figure 1:
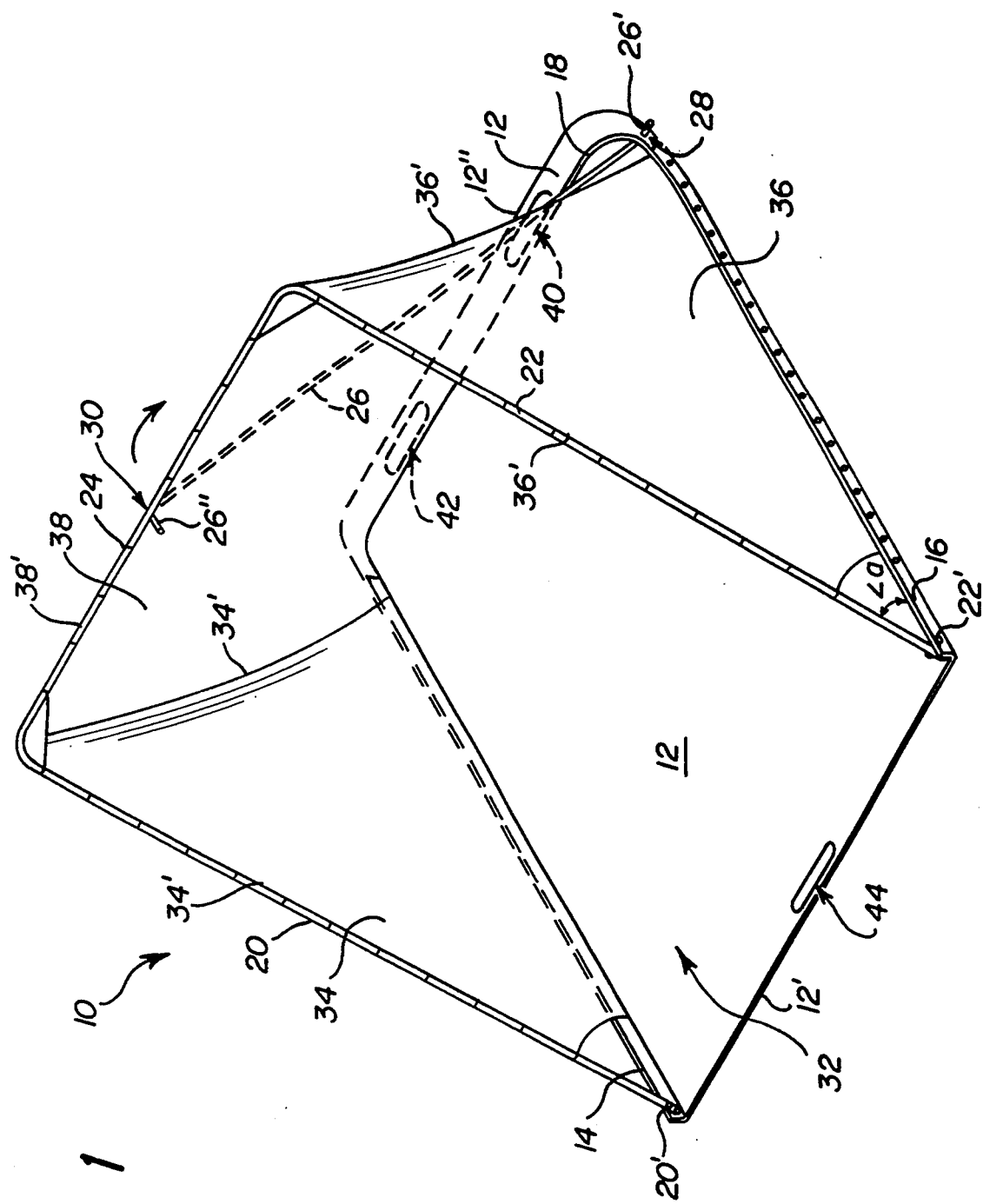
FIG. 1 is a perspective view of the bagger in its fully opened state.
Figure 4:
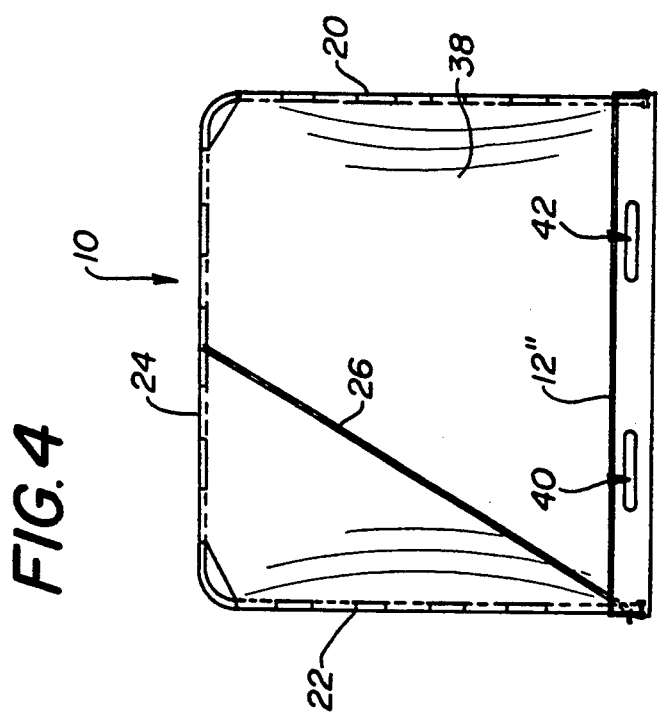
FIG. 4 is a rear, elevational view thereof.
Figure 2:
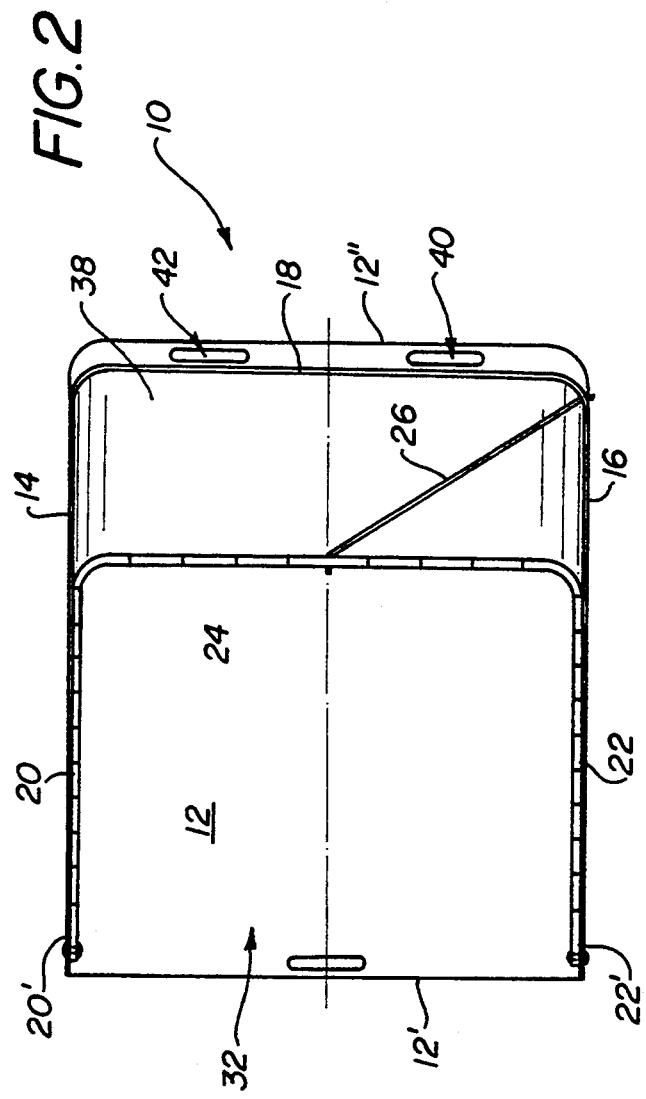
FIG. 2 is top plan view thereof.
Figure 3:
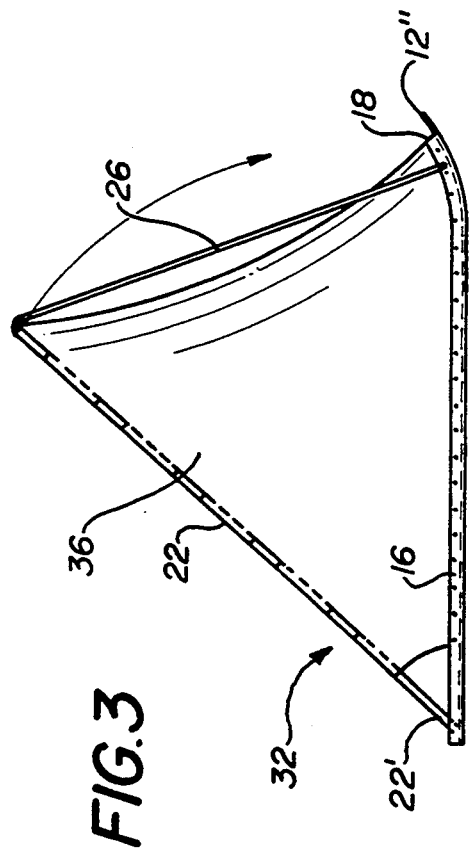
FIG. 3 is a side, elevational view thereof.

Referring now to the drawings, there is seen in the various Figures the inventive lawn and garden bagger designated generally by the reference numeral 10. Bagger 10 is intended as a reusable, collapsible container for greatly facilitating the collection and subsequent transportation of loose debris such as leaves, small twigs, branches, and grass clippings, for example, to a location remote from the initially cleaned area. In this respect, it is intended that bagger 10 be used by laying it flatly upon the ground, securing it in its open position, and depositing the loose debris therein, preferably with a lawn tool such as a rake, for example. Once filled, the bagger is drawn along the ground by its front handle to a debris deposit location whereupon the debris is dumped from the bagger by lifting it upwardly from its rear end where a second handle means is provided. As will become apparent from the ensuing description, the entire bagging, transporting, and unloading process is accomplished in a manner requiring a minimum of bending and imparting very little strain upon the worker.

More particularly, bagger 10 is seen to comprise a collapsible container having a bottom wall 12 of generally rectangular outline which is preferably molded or otherwise formed from a rigid, durable material such as polyethylene, although other suitable materials may be used which would stand up to repeated dragging along a ground surface. Bottom wall 12 is seen to include upwardly turned side edges 14 and 16, and a rear edge 18 which may be formed in the non-interrupting, contiguous manner shown. An upper, U-shaped framework having elongated, first and second side and rear members 20, 22 and 24, respectively, is pivotally attached at the opposite, free ends 20' and 22' of side members 20 and 22, respectively, adjacent the front edges of the bottom side walls 14 and 16, respectively, whereby the upper frame may be moved both toward and away from the bottom wall 12 in accordance with the directional arrows. In the fully raised position of the upper frame shown in the Figures, the upper frame and bottom wall make an approximately 45 degree angle "a", with this position of the frame being maintained by an elongated arm 26 which includes bottom and top, bent ends 26' and 26" removably secured within respective holes 28 and 30 formed within the rear portion of side edge 16 and approximately the center portion of the rear frame member 24. In this fully raised condition of the upper frame, a large front opening 32 is created wherethrough debris is passed into the container 10. In this respect, flexible panels of material 34, 36 and 38 are provided which attach to and extend between the upper frame and bottom wall of the container, respectively.

The panels 34, 36 and 38 may be a single piece of material which is affixed (e.g., by sewing) along three top edges 34', 36' and 38' thereof to the upper frame members 20, 22 and 24, respectively. The panels 34, 36 and 38 form a bellows-like container with bottom wall 12, with panels 34, 36 and 38 being pulled substantially taut in the fully opened condition of container 10, yet collapse upon themselves upon moving the upper frame and bottom wall 12 together to close the container (this position not shown). Fabric panels 34, 36 and 38 may be made of any suitable, durable material which is preferably water and mildew resistant, e.g., plastic.

During use, it is intended that bottom wall 12 lie flatly upon the ground near the place to be cleaned with the upper fame thereof fixed in the fully raised position shown in the drawings. The worker deposits loose debris into container 10 through the front opening 32 thereof. Once the container is full, it may be easily dragged along the ground surface by the worker grasping bottom wall 12 through elongated opening 44 formed therethrough adjacent the front edge 12' thereof. In this regard, it is seen that the rear edge 12" of bottom wall 12 curves slightly upward which raises the rear end above the ground for ease of dragging of the container along the ground. The external surface of bottom wall 12 should be formed very smoothly such that it may slide very easily along a ground surface, yet also be very durable so that it can withstand the repeated friction created between it and the ground surface as it is being dragged therealong. As mentioned above, a material from which bottom wall 12 may be formed is polyethylene.

Once the worker has pulled the full container to the dump site, container 10 is emptied by lifting the rear portion thereof upwardly by the worker passing their fingers through the elongated openings 40 and 42 formed in the bottom wall 12 adjacent the rear edge 12" thereof. Once emptied, container 10 may be carried back to the cleaning site by grasping front handle 44. It is noted that container 10 is very lightweight since bottom wall 12 is made relatively thin-walled, and the upper frame is preferably formed of hollow aluminum or plastic tubing.

While the invention has been shown and described with reference to a preferred embodiment thereof, it will be appreciated to those skilled in the art that various modifications may be made thereto without departing from the full spirit and scope thereof as defined by the claims which follow.

What is claimed is:

1. A reusable container for collecting and transporting a quantity of looses debris therein, said container comprising:
   a) a rigid bottom wall having opposite front and rear edges;
   b) an upper frame pivotally connected to said bottom wall adjacent said front edge thereof and being movable between fully raised and lowered positions, said upper frame and bottom wall defining a front opening adjacent said front edge of said bottom wall, said container having an internal cavity accessible through said front opening when said frame is in said fully raised position, said upper frame and bottom wall lying in overlapping relation when said upper frame is moved to said fully lowered position;
   c) flexible side wall means attached between said upper frame and bottom wall which extend substantially taut when said upper frame is in said fully raised position, and which collapse upon themselves when said upper frame is moved to said fully lowered position; and d) means selectively retaining said upper frame in said fully raised position.

2. The reusable container of claim 1 and further comprising first handle means associated with said bottom wall adjacent said front opening thereof.

3. The reusable container of claim 2 and further comprising second handle means associated with said bottom wall adjacent said rear edge thereof.

4. The reusable container of claim 1 wherein said bottom wall is of substantially rectangular outline having first and second, opposite side edges extending between said front and rear edges thereof, said upper frame being formed in a generally U-shaped configuration having first and second, opposite free ends pivotally connected to said first and second, opposite side edges of said bottom wall adjacent said front edges, respectively.

5. The reusable container of claim 4 wherein said upper frame is substantially the same length and width dimensions as said bottom wall.

6. The reusable container of claim 4 wherein said upper frame is made of tubular aluminum.

7. The reusable container of claim 4 and further comprising first and second handle means attached to said bottom wall adjacent said front and rear edges thereof, respectively.

8. The reusable container of claim 1 wherein the portion of said bottom wall located adjacent said rear edge curves upwardly toward said upper frame.

9. The reusable container of claim 4 wherein the portion of said bottom wall located adjacent said rear edge curves upwardly toward said upper frame.

10. The reusable container of claim 4 wherein said bottom wall first and second, opposite side edges extend perpendicular to said bottom wall, and wherein said upper frame is pivotally attached to said first and second side edges.

* * * * *